(12) United States Patent
Arnott

(10) Patent No.: US 7,041,221 B2
(45) Date of Patent: May 9, 2006

(54) METHOD FOR REMOVING OIL SPILLS

(76) Inventor: Brian Arnott, 3602 McKay Rd., Tomahawk, WI (US) 54487

( * ) Notice: Subject to any disclaimer, the term of this patent is extended or adjusted under 35 U.S.C. 154(b) by 0 days.

(21) Appl. No.: 10/709,172

(22) Filed: Apr. 19, 2004

(65) Prior Publication Data

US 2005/0230316 A1 Oct. 20, 2005

(51) Int. Cl.
*B01D 15/00* (2006.01)
(52) U.S. Cl. ............... 210/660; 210/679; 210/680; 210/690; 210/691; 210/922
(58) Field of Classification Search ........... 210/922, 210/660, 679–680, 690–691, 923–925
See application file for complete search history.

(56) References Cited

U.S. PATENT DOCUMENTS

| | | | |
|---|---|---|---|
| 3,628,607 A | 12/1971 | Dietz | |
| 3,667,608 A | 6/1972 | Burroughs | |
| 3,698,850 A | 10/1972 | Spartin | |
| 3,946,953 A * | 3/1976 | Hato | 241/79.2 |
| 4,222,868 A | 9/1980 | Kuris | |
| 4,472,203 A * | 9/1984 | Miyahara et al. | 127/46.2 |
| 4,481,113 A * | 11/1984 | Canevari | 210/680 |
| 4,525,711 A * | 6/1985 | Gery | 340/815.42 |
| 5,061,382 A | 10/1991 | Halter et al. | |
| 5,160,629 A | 11/1992 | Brown | |
| 5,183,579 A * | 2/1993 | Eller | 210/776 |
| 5,244,574 A | 9/1993 | Gatt | |
| 5,300,219 A | 4/1994 | Braid | |
| 5,342,525 A * | 8/1994 | Rowsell | 210/611 |
| 5,366,756 A * | 11/1994 | Chesterfield et al. | 427/2.26 |
| 5,409,607 A | 4/1995 | Karlberg | |
| 5,423,340 A | 6/1995 | Campbell | |
| 5,451,325 A | 9/1995 | Herkenberg | |
| 5,558,777 A | 9/1996 | Kemnetz | |
| 6,121,038 A | 9/2000 | Kirschner | |
| 6,841,077 B1 * | 1/2005 | Gannon et al. | 210/692 |
| 2003/0222025 A1 * | 12/2003 | Archuleta | 210/691 |

FOREIGN PATENT DOCUMENTS

| | | |
|---|---|---|
| DE | 2947281 A | 5/1981 |
| DE | 4109577 A1 | 9/1992 |
| EP | 00370349 B1 | 12/1991 |
| EP | 00507784 B1 | 10/1994 |
| NO | 145728 B | 2/1982 |
| NO | 148862 B | 9/1983 |

OTHER PUBLICATIONS

Perry's Chemical Engineer's Handbook, 5th edition, 1973, p. 8/19.*
The Handbook of Chemistry and Physics, CRC Publishing, 59th edition, 1979, at p. F158.*
Bjorndalen et al.; Jul. 1, 2003; Offshore oil and gas environmental effects monitoring workshop; approaches and technologies, Dartmouth, NS (Canada), May 26-30, 2003; In: Program and abstracts of the offshore oil and gas environmental effects monitoring workshop : approaches and technologies.
PB-96-857578/XAB; Oil spill removal : Dispersants, absorbents, booms, and skimmers. (Latest citations from the Life Sciences Collection database). Published Search EDB 96-07.
Oil spill removal techniques and equpment. (Latest citations from fluidex). Published Search EDB 95-18 95:115630 95001438534 NDN- 108-0615-6128-2; PB-95-878955/XAB.
Oil spill removal techniques and equipment. (Latest citations from Oceanic abstracts). Published Search; EDB 94-05 94:028206 94001132169 NDN- 106-0590-2106-1; PB-94-859212/XA.
Parker, H. W. et al., 1992; pp. 205-207; Proceedings of emerging technologies for hazardous waste management, vol. 1; Cotton for removal of aquatic oil sp; (Texas Tech Univ., Tedder, D. W.), (School of Chemical Engineering, Georgia Inst. of Technology, Atlanta, GA (US).
Sadeghi, K. M. et al.; J. Petrol. Sci. Eng. (Amst.); A new bitumen recovery technology and its potential application to remediation of oil spills; vol. 8, No. 2, Sep. 1992, PP.
Felzmann, H. P. et al.; Erdoel Kohle, Erdgas, Petrochem. Brennst.-Chem.; vol. 45, No. 10, Oct. 1992, pp. 371-375; Remediation of oil spills.
Aunaas, T.; May 1987, pp. 261-272; Biological effects of chemical treatment of oil spills at sea., In situ and in vivo effects of a topped Stratford A+B crude oil being treated with the Finasol OSR 6 dispersant on marine organisms.

(Continued)

*Primary Examiner*—Chester T. Barry
(74) *Attorney, Agent, or Firm*—LaFollette Godfrey & Kahn; Sonali S. Srivastava

(57) ABSTRACT

The present invention provides methods and apparatus for removing oil and oil containment for oil spills using crushed glass.

23 Claims, No Drawings

OTHER PUBLICATIONS

Matveyenko, L. M. et al.; Azerb, Neft. Khoz.; No. 12, 1983, pp. 66-67; A method for localizing and removing oil spills in the open sea.

Spandick, W. et al; MT, Meerestechnik, vol. 14, No. 1, Feb. 1983, pp. 17-22; Draft of a prototype of an oil catcher for removing oil spills from the sea.

Koblanski, J. N.; J. Can. Pet. Technol.; vol. 20, No. 3, Jul.-Sep. 1981; pp. 92-96; Oil spill removal in the marine environment utilizing acoustic energy.

Removal of Oil Spills—Retro Search Reports from Nerac.com.

* cited by examiner

METHOD FOR REMOVING OIL SPILLS

TECHNICAL FIELD

The present invention generally relates to removal of oil spills, specifically, the invention relates to methods and apparatus for removing oil spills using crushed glass.

BACKGROUND ART

Numerous methods and apparatus for removal of oil spills are well known and established in the art.

In recent years there has been an ever increasing awareness of the devastating environmental damage that can be caused by oil spills. It is well recognized that an extremely important aspect of minimizing damage from an oil spill is the prompt containment and collection of the spilled oil. Effective collection of spilled oil ideally involves the absorption of oil in some absorption medium that can be easily raked or otherwise picked up from the surface upon which the oil has spilled. Nevertheless, despite intensive research and testing, the only absorption substances which are at all suitable for use in cleaning up oil spills involve significant defects or difficulties.

Some conventional oil absorbents currently in commercial use are made from polypropylene. Polypropylene absorbs hydrocarbons but is hydrophobic. That is, it is water repellent. However, polypropylene has a limited oil absorbing capacity, and is not at all biodegradable. Also, polypropylene is quite expensive to use in the large quantities necessary to deal with major oil spills. Other methods for oil removal include using absorbents containing polyethylene films, magnetic materials in combination with polyurethane, such as polyurethane containing iron powder, magnetic separation with magnetite and maghemite, acoustic energy, ultrasonic eneregy, in-situ combustion of oil, polyether containing isocynate end groups, solidifiers, demulsifying agents, surface washing agents and dispersants combination polymers such as viscose rayon, polyamide fibers and small rubber adhering to the fibers.

Yet other efforts require using fish scale powder or biosurfactants such as rhamnolipid as an environmentally friendly and economically viable remediation option. Efforts also include finding other biodegradable oil absorbent materials suitable for cleaning up oil spills. Other biodegradation agents including micro-organisms capable of degrading hydrocarbons, liposomes, bacterial mixtures, enzymes, or fertilizers have been proposed, however, only some of these are commercially viable. For example, peat moss has been used for this purpose. However, in the form in which it is obtainable commercially, peat moss contains a significant amount of impurities such as a sand and carbon. Also, peat moss does not float on water well and is limited in its absorption capacity for oil. For example, one pound of peat moss will absorb about five pounds of oil. In addition, peat moss is not totally biodegradable. Organoclay made by a reaction of smectite clay and quaternary ammonium compound have also been used as oil spill remediation agents.

Another substance which has been tested for its oil absorbent capacity in cleaning up oil spills is a seaweed-based product that is normally sold as a soil conditioner. This product is sold under the registered trademark, AFRIKELP, and is comprised of a blend of selected brown seaweeds found off the southern coast of the African continent. However, this product is rather expensive and has a limited oil absorption capability. Biodegradable remedies for removing oil from spills also include using coconut coir pit, dried corn cobs in their natural state or raw cotton. Other chemical dispersants, gelling agents, inorganic clays, foam plastics, booms, skimmers are also well known in the art.

Most of the existing materials are either manufactured for remediation of oil spills and thus have real costs associated with the manufacture or require harvesting which may be equally labor intensive. Further, existing art does not teach methods and apparatus with a concomitant effect of recycling undesirable waste, which would otherwise occupy landfills.

Accordingly, the need exists for an improved oil remediation method and apparatus that uses discarded recyclable materials, with minimal cost of processing and biohazard for marine life. Of course, the present invention may be used in a multitude of systems where similar oil removal capabilities are desired. Thus, the present invention should not be interpreted as being, limited to application in removal of oil from oil spills.

SUMMARY OF THE INVENTION

The present method in general provides methods and apparatus for removing oil from oil spills and preventing oil spills from occurring.

In a preferred embodiment, the present invention provides a method of removing oil from oil containing surfaces, comprising the step of applying crushed glass to the surface. The application of crushed glass generally reduces the quantity of oil from the surface. Further, the oil absorbed on the crushed glass is recycled as petroleum-silica based product, water repellent, roof shingles, or asphalt.

In a preferred embodiment the surfaces may include water, saline water, earth, ground, dirt, mud, gravel, land surrounding water bodies, land beneath water bodies, sand, seashore, estuary, bay, gulf, oceans, lakes or rivers.

In a preferred embodiment of the present invention, the crushed glass used in removing oil is recyclable glass; however, non-recyclable glass may also be used. Also preferably, crushed glass includes colored glass; however, other non-colored glass may also be used. This crushed glass may be prepared using an impact crusher, hammer mill, cone crusher or a roller crusher. Preferably, the recyclable glass is crushed using roller crusher. The crushed glass is pre-crushed and pre-screened, as necessary. The crushed glass is pre-screened through a mesh, which may include an inch mesh, a combination of double or triple deck screens or at least two meshes. Once pre-screened through the mesh, the crushed glass is dried after to at least 100° F., in a preferred embodiment, or to at least 350° F. in another preferred embodiment. Subsequently, the crushed glass is screened through at least a 40 mesh in a preferred embodiment, or through a 30 mesh in another preferred embodiment, or through a 20 mesh, in yet another preferred embodiment.

In a preferred embodiment, the present invention also provides a method of removing oil from oil containing surfaces, comprising the step of applying crushed glass to the surface, whereby quantity of oil is reduced from the surface, wherein the crushed glass is pre-crushed, pre-screened, dried and screened prior to application on the surface. Preferably, the crushed glass is dried to temperature about 200–350° F. Also preferably, the crushed glass is screened with at least a 40 mesh.

In a preferred embodiment, the present invention also provides an apparatus for removing oil from oil containing surfaces, comprising an application member and a collection member. The application member is capable of applying crushed glass on the surface, whereas the collection member is capable of collecting oil absorbed on the crushed glass. Further, the crushed glass is pre-crushed, pre-screened, dried and screened prior to applying the crushed glass on the surface. Preferably, the crushed glass is screened with at least a 40 mesh. Also, preferably, the crushed glass is dried to a temperature about 200–350° F. Further, the oil absorbed on the crushed glass is recycled as petroleum-silica based product, water repellent, roof shingles, or asphalt.

In another preferred embodiment, the present invention provides a method of preventing oil spills from a container having oil, comprising the step of surrounding the oil container at least in part with a layer of crushed glass. The crushed glass is pre-crushed, pre-screened, dried and screened prior to surrounding the oil container with crushed glass. Preferably, the crushed glass is screened with at least a 40 mesh. Also preferably, the crushed glass is dried to a temperature about 200–350° F. In a preferred embodiment, the oil container is an underground oil storage tank.

In sum, the present invention represents a significant improvement over the prior art in many ways, including using recyclable discarded material, and ease of use. These and other objects and advantages of the present invention will become apparent from the detailed description accompanying the drawings.

DISCLOSURE OF INVENTION

The present method in general provides methods and apparatus for removing oil from oil spills and preventing oil spills from occurring.

In a preferred embodiment, the present invention provides a method of removing oil from oil containing surfaces, comprising the step of applying crushed glass to the surface. The application of generally reduces the quantity of oil from the surface.

Oil

Any petroleum based product, including crude oil, gasoline, diesel and paint thinners or any inflammable fluid or solid.

In a preferred embodiment the surfaces may include water, saline water, earth, ground, dirt, mud, gravel, land surrounding water bodies, land beneath water bodies, sand, seashore, estuary, bay, gulf, oceans, lakes or rivers.

In a preferred embodiment of the present invention, the crushed glass used in removing oil is recyclable glass; however, non-recyclable glass may also be used. Also preferably crushed glass includes colored glass; however, other non-colored glass may also be used.

A testing of colored crushed glass, which may include a combination or a mixture of recyclable glass, for example, clear or colored beer bottles and chemical containers, indicated that this combination had a chemical content as shown below:

| Sample | pH | Calcium | Magnesium | Sodium | Est. CEC |
|---|---|---|---|---|---|
| 031504A | 9.9 | 4.2 ppm | 0.164 ppm | 108 ppm | 4.461 |
| 031504B | 10.0 | 4.00 ppm | 0.154 ppm | 112 ppm | 4.264 |

A testing of clear crushed glass showed chemical content of crushed glass as below:

| Sample | pH | Calcium | Magnesium | Sodium | Est. CEC |
|---|---|---|---|---|---|
| 403 | 10.3 | 220 ppm | 10 ppm | 83 ppm | 1.245 |
| 402 | Soluble salts - 16 MHOS × $10^{-5}$ | | | | |

The inventor also observed that while both colored and clear glass absorbed oil, clear glass absorbed water better than colored glass. This difference may be accounted by the fact that colored glass has 73 times higher concentration of Sodium as compared to Calcium and Magnesium, as shown below:

[Na]: [[Ca]+[Mg]]:: 0.36:1 for clear glass; and

[Na]: [[Ca]+[Mg]]:: 26:1 for mixed glass,

Increased sodium concentration may enhance oil absorption. While, applicant believes increased oil absorption may be based on sodium concentration, the invention is not limited by this theory, and other reasons may well explain the observed difference in oil adsorption.

In a preferred embodiment, the crushed glass may be prepared using an impact crusher, hammer mill, cone crusher or a roller crusher. Preferably, the recyclable glass is crushed using roller crusher. Inventor has further observed that better oil adsorption occurs when the glass is crushed using a roller crusher.

Any order of pre-crushing, pre-screening, crushing, and drying may be used. In a preferred embodiment however, the crushed glass is first pre-crushed and pre-screened, as necessary. If the glass is clean, no pre-crushing or pre-screening is required. The pre-crushed glass is pre-screened through a mesh, which may include an inch mesh, a combination of double or triple deck screens or at least two meshes. Once pre-screened through the mesh, the glass is further crushed using a roller crusher and subsequently, the crushed glass is dried after to at least 100° F. in a preferred embodiment, or to at least 350° F. in another preferred embodiment. Subsequently, the crushed glass is screened through at least a 40 mesh in a preferred embodiment, or through a 30 mesh in another preferred embodiment, or through a 20 mesh, in yet another preferred embodiment.

Generally 40, 30, 20 mesh imply about 40×40, 30×30 and 20×20 number of wires running along a vertical and horizontal axis, per inch. Therefore an inch mesh would indicate that each grid of the mesh is 1"×1", or 40 mesh would indicate that each grid is 1/40"×1/40" in width and length. For 40 mesh, the wire diameter is about 0.01". Such meshes are commercially available as single, double or triple decked screens. For, example, such meshes are commercially available at Twin City Wire, Minnesota. Further, the oil absorbed on the crushed glass is recycled as petroleum-silica based product, water repellent, roof shingles, or asphalt.

In a preferred embodiment, the present invention also provides a method of removing oil from oil containing surfaces, comprising the step of applying crushed glass to the surface, whereby quantity of oil is reduced from the surface, wherein the crushed glass is pre-crushed, pre-screened, crushed, dried and screened prior to application on the surface. Preferably, the crushed glass is dried to temperature about 200–350° F. Also preferably, the crushed glass is screened with at least a 40 mesh.

In a preferred embodiment, the present invention also provides an apparatus for removing oil from oil containing surfaces, comprising an application member and a collection member. The application member may include a nozzle for spraying crushed glass. Wider nozzles may be used to cover greater surface area of application. Generally, the application member is capable of applying crushed glass on the surface, whereas the collection member is capable of collecting oil absorbed on the crushed glass. The collection members may include altered fishing nets, with reduced net size, large wired receiving baskets or any organic or inorganic net, such as steel wire or polymer based nets for receiving clumps of oil-crushed glass mixtures. Once the clumped mixtures are retrieved they may be recycled in any desirable way. In one embodiment, more crushed glass may be added to alter the consistency of the clump, which may be then recycled as asphalt. Further, the crushed glass is pre-crushed, pre-screened, crushed, dried and screened prior to applying the crushed glass on the surface. Preferably, the crushed glass is screened with at least a 40 mesh. Also, preferably, the crushed glass is dried to a temperature about 200–350° F. Further, the oil absorbed on the crushed glass is recycled as petroleum-silica based product, water repellent, roof shingles, or asphalt.

Other well known techniques, such as helicopter drop of fire retardants, known to one of ordinary skill in the art may also be used for dispersing crushed glass on a desired surface of application.

In another preferred embodiment, the present invention provides a method of preventing oil spills from a container having oil, comprising the step of surrounding the oil container at least in part with a layer of crushed glass. The crushed glass is pre-crushed, pre-screened, crushed, dried and screened prior to surrounding the oil container with crushed glass. Preferably, the crushed glass is screened with at least a 40 mesh. Also preferably, the crushed glass is dried to a temperature about 200–350° F. In a preferred embodiment, the oil container is an underground oil storage tank. Other underground or over the ground containers are also contemplated. Other uses also include surrounding oil tankers in the high seas and river at least in part with crushed glass.

Following examples illustrate the use of crushed glass for removing oil. These examples are for illustration only and should not be deemed to limit the scope of the invention.

EXAMPLE I

Colored crushed glass, screened though 40 mesh was applied on clean water, without oil. The crushed glass was applied on the water surface until it sank. The water was poured out from the container and the crushed glass was removed after about an hour. The crushed glass was observed and it was determined that the crushed glass did not absorb the water.

EXAMPLE II

Oil was poured in a tank containing water to simulate an oil spill. Crushed glass was applied on the surface of the oil spill. The crushed glass noticeably adsorbed the oil and sank to the bottom of the tank in a clump. The water from the tank was emptied out. The crushed glass-oil mixture came out bonded together. More crushed glass was added to the crushed glass-oil mixture and was removed. Adding additional glass formed a ball with a petroleum base, which may be further recycled and used for other purposes.

EXAMPLE III

Oil was poured in a tank containing water to simulate an oil spill. Colored screened crushed glass was applied on the surface of the oil spill. The crushed glass noticeably adsorbed the oil and sank to the bottom of the tank in a clump. The crushed glass-oil mixture clump was left to sit on the bottom of the water tank for almost three months. The crushed glass-oil mixture was still clumped together and the water above it was clear. Water did not get into the mixture.

EXAMPLE IV

Oil was poured in a tank containing water to simulate an oil spill. Various petroleum products such as motor oil, transmission oil, hydraulic oil, gasoline and thinners were used. Crushed glass screened through 40 mesh was applied on the surface of the oil spill. The crushed glass noticeably adsorbed the oil and sank to the bottom of the tank in a clump. Other mesh sizes were used; however, best results were obtained by 40 mesh.

EXAMPLE V

Oil was poured in a tank containing water to simulate an oil spill. Glass was crushed using an impact crusher and a roller crusher. The crushed glass was applied on the water surface until it sank. Impact crushed glass appeared to adsorb more water when emptied into clean water, which later turned into mud. The glass crushed with the roll crusher adsorbed oil better than glass crushed by an impact crusher. This may be because glass becomes more porous upon impact from the impact crusher.

EXAMPLE VI

Mixed-colored and clear crushed glass coming out of the dryer at the same temperature were separately applied on a water surface until they sank. When clear crushed glass was applied to a clean tank of water, it appeared to absorb water and turn into mud.

EXAMPLE VII

Oil was poured in a tank containing sand and water to simulate an oil spill. Crushed glass was applied to the surface of the water containing oil. The crushed glass adsorbed oil and sunk. Oil sinking to the bottom of a sand water bed was tested. After allowing the crushed glass-oil mixture to sit in the water tank for one week, the water was dumped and the glass-oil mixture was allowed to sit for another week on the sand bed. The oil adsorbed in the crushed glass did not appear to penetrate the sand bed.

The method and apparatus for removing oil of the present invention may have other applications aside from use in oil spills. Thus, although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

The invention claimed is:

1. A method of using crushed glass for removing oil from an oil containing surfaces, comprising the step of: applying said glass to the oil containing surface, wherein said glass is formed by the process of (a) crushing glass using an impact crusher, hammer mill, cone crusher or a roller crusher; (b)

screening the crushed glass using at least one mesh; and (c) drying the crushed glass at least to 100° F.;

whereby the quantity of oil is reduced from the surface.

2. A method according to claim 1, wherein said surface includes water or soil containing oil.

3. A method according to claim 1, wherein the crushed glass is recyclable glass.

4. A method according to claim 1, wherein the crushed glass is formed by the process of crushing glass using a roller crusher.

5. A method according to claim 1, wherein the crushed glass is colored glass.

6. A method according to claim 1, wherein the crushed glass is screened through at least one mesh.

7. A method according to claim 6, wherein the mesh is an inch mesh.

8. A method according to claim 1, wherein the crushed glass is screened through at least two meshes.

9. A method according to claim 6, wherein the crushed glass is dried to at least 100° F. after screening through the mesh.

10. A method according to claim 9, wherein the crushed glass is dried to at least 350° F.

11. A method according to claim 7, wherein the crushed glass is further screened through at least a 40 mesh.

12. A method according to claim 7, wherein the crushed glass is further screened through a 30 mesh.

13. A method according to claim 7, wherein the crushed glass is further screened through a 20 mesh.

14. A method according to claim 1, wherein the oil from the oil containing surface is adsorbed on the crushed glass and the oil with the crushed glass is further recycled as petroleum silica based product, water repellant product, roof shingles or asphalt.

15. A method of removing oil from oil containing surfaces, comprising the step of; applying crushed glass to said surface, whereby the quantity of oil is reduced from the surface, wherein the crushed glass is crushed, dried and screened prior to application on the surface.

16. A method according to claim 15, wherein the crushed glass is dried to temperature about 200–350° F.

17. A method according to claim 15, wherein the crushed glass is screened with at least a 40 mesh.

18. A method according to claim 14, wherein the oil from the oil containing surface is adsorbed on the crushed glass and the oil with the crushed glass is further recycled as petroleum silica based product, water repellant product, roof shingles or asphalt.

19. A method of containment of oil spills from an oil container, comprising the step of:

providing the oil container at least in part with a layer of crushed glass.

20. A method according to claim 19, wherein the crushed glass is crushed, dried and screened prior to surrounding the oil container with crushed glass.

21. A method according to claim 20, wherein the crushed glass is screened with at least a 40 mesh.

22. A method according to claim 20, wherein the crushed glass is dried to a temperature about 200–350° F.

23. A method according to claim 19, wherein the oil container is an underground oil storage tank.

* * * * *